United States Patent [19]

Oien

[11] Patent Number: 5,497,864

[45] Date of Patent: Mar. 12, 1996

[54] HYDRAULIC BRAKE BLEEDER APPARATUS

[75] Inventor: Gene Oien, Loves Park, Ill.

[73] Assignee: Chrysler Corporation, Highland Park, Mich.

[21] Appl. No.: 493,226

[22] Filed: Jun. 20, 1995

[51] Int. Cl.⁶ .................................................. B60T 11/30
[52] U.S. Cl. ................................................ 188/352; 60/584
[58] Field of Search ............................... 188/352, 152; 60/584; 141/98; 417/375, 380, 390

[56] References Cited

U.S. PATENT DOCUMENTS

| | | | |
|---|---|---|---|
| 1,825,013 | 9/1931 | Patton | 188/352 |
| 2,295,539 | 9/1942 | Beach | 188/352 |
| 2,704,034 | 3/1955 | Jones | 417/390 |
| 3,154,087 | 10/1964 | Beaver | 188/352 X |
| 3,339,401 | 9/1967 | Peters | 188/352 |
| 3,548,978 | 12/1970 | Dyke | 188/352 |
| 4,415,071 | 11/1983 | Butler et al. | 188/352 |
| 5,060,703 | 10/1991 | Koerner | 188/352 |

*Primary Examiner*—Douglas C. Butler
*Attorney, Agent, or Firm*—Edward A. Craig

[57] ABSTRACT

A hydraulic brake bleeder apparatus for bleeding hydraulic brake fluid from a vehicle hydraulic brake system is provided. The apparatus includes a vacuum pump for drawing brake fluid from a vehicle brake cylinder and a pneumatic motor for driving the vacuum pump. A brake fluid recovery reservoir is located beneath the vacuum pump for emptying hydraulic brake fluid drawn by the pump from a brake cylinder. A brake fluid supply container is provided for replenishing the master cylinder hydraulic brake fluid which is drawn from the brake cylinders during a bleeding operation.

5 Claims, 2 Drawing Sheets

HYDRAULIC BRAKE BLEEDER APPARATUS

BACKGROUND OF THE INVENTION

1. Field of the Invention

The present invention relates to hydraulic brake bleeder apparatus for bleeding hydraulic brake fluid from a vehicle hydraulic brake system.

2. Description of the Prior Art

Vehicle hydraulic brake systems conventionally comprise a master cylinder and individual cylinders for each wheel. The master cylinder is connected to the brake cylinders by means of fluid lines. A special hydraulic brake fluid is used in the system. Occasionally, it happens that air bubbles become entrained in the hydraulic brake fluid. Such air bubbles affect the operational characteristics of the brake system. When the brake pedal is depressed, brake fluid is placed under pressure in the master cylinder and this pressure is communicated to each of the wheel brake cylinders. Communication of the pressure from the master cylinder to the brake cylinders is substantially instant and in direct proportion to the pressure applied to the master cylinder. However, when air is entrained in the hydraulic fluid of the system, it will be compressed upon an increase of fluid pressure in the brake system (it being appreciated that hydraulic brake fluid is a liquid which is substantially incompressible). Compression of the air results in reducing the brake pressure applied and also causing a time delay between application of pressure via the brake pedal and reflection of such pressure in the brake cylinders. The common remark is that a brake system having any substantial amount of entrapped air results in a "spongy" operation of the brake system.

The conventional method for correcting this problem is to bleed brake fluid from the system and thereby get rid of that portion of the brake fluid which has air entrapped therein.

This process is normally a two person job. It is necessary for one person to apply fluid pressure to the hydraulic brake system during the bleeding operation. This is accomplished either by one person applying pressure via the brake pedal or applying pressure by use of a manually-operated pressure apparatus. The second person controls the bleeding operation from a standpoint of drawing fluid from the system and watching the fluid to make sure that all fluid having air bubbles therein is extracted from the system. It is also necessary for this person to frequently check the fluid level of the master cylinder reservoir to be sure that adequate hydraulic brake fluid is present at all times.

In accordance with the present invention, brake bleeder pump means are actuated by a pneumatic motor, thus eliminating the need for one person to generate brake fluid pressure. Additionally, brake fluid is automatically supplied to the master cylinder reservoir by means of hydraulic brake fluid supply means attachable to the master cylinder reservoir, thus eliminating the need to check the level of fluid in the reservoir.

SUMMARY OF THE INVENTION

Hydraulic brake bleeder apparatus for bleeding hydraulic brake fluid from a vehicle hydraulic brake system is provided. The vehicle hydraulic brake system includes a hydraulic master cylinder apparatus hydraulically connected to the hydraulic cylinders of a plurality of hydraulic vehicle brakes. The master cylinder apparatus includes a hydraulic master cylinder having a hydraulic fluid reservoir with a threaded inlet opening.

The apparatus includes a vacuum pump having an input shaft and a pneumatic motor having an output shaft. Coupling means operatively connect these two shafts together whereby the pump is driven by the motor.

The pneumatic motor has a compressed air inlet. This air inlet is connected to a source of compressed air by means of a flexible tube for powering the pneumatic motor. The pneumatic motor has a manually actuatable valve for controlling the input of compressed air to the motor.

The vacuum pump has a vacuum inlet and a pressure outlet. A first flexible tube is attached to the vacuum inlet and a second flexible tube is attached to the pressure outlet. The first flexible tube is connectable to a brake cylinder bleeder valve for drawing hydraulic brake fluid from the brake cylinder. A hydraulic brake fluid recovery reservoir is provided. The second flexible tube is attached to the hydraulic brake fluid recovery reservoir for emptying hydraulic brake fluid therein that is drawn from the brake cylinder.

Hydraulic brake fluid supply means are provided. The supply means are attachable to the master cylinder means of a vehicle hydraulic brake system to replenish the hydraulic brake fluid which is drawn from the brake cylinders. The hydraulic brake fluid supply means comprises a container for hydraulic brake fluid. The container has an opening for filling and emptying the container. The opening of the container is engageable with the threaded inlet opening of the hydraulic fluid reservoir in fluid communication therewith.

The threaded inlet opening of the hydraulic fluid reservoir comprises a tubular projection extending from the reservoir and terminating in an externally threaded open end provided to normally threadingly receive a threaded closure cap. The container for hydraulic fluid has a bottom from which a tubular projection extends. This tubular projection terminates in an open end portion. An internally threaded collar is slidingly received on this end portion. The end portion of the container tubular projection is receivable in the tubular projection extending from the reservoir with the collar threadingly received on the threaded end thereof to thereby secure the container on the reservoir in fluid communication therewith for gravity flow of hydraulic brake fluid thereinto.

A fluid valve is preferably provided in the container tubular projection. The valve has an open position and a closed position. Manually actuatable means are provided to facilitate opening and closing of the valve to control fluid flow into the reservoir.

Preferably, a mobile cart is provided having an upper shelf and a lower shelf. The vacuum pump and pneumatic motor may be received on the upper shelf and the hydraulic brake fluid recovery reservoir may be received on the lower shelf. The position of the elements may be reversed if desired.

DETAILED DESCRIPTION OF A PREFERRED EMBODIMENT

Figure 2:
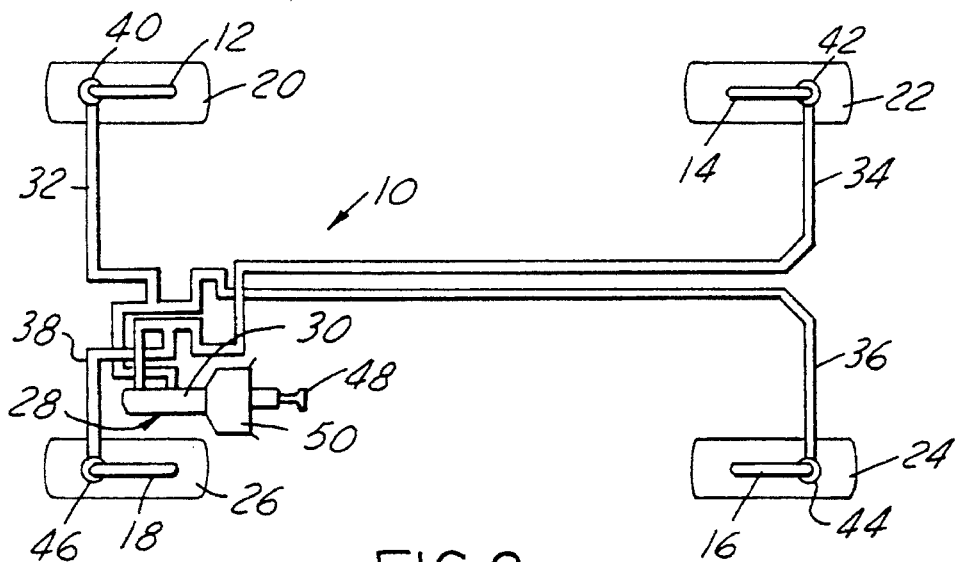
FIG. 2 is a diagrammatic plan view illustrating a typical four wheel vehicle brake system.

Referring first to FIG. 2, a typical four wheel hydraulic vehicle brake system 10 is illustrated. In such systems, a wheel brake 12, 14, 16, 18 is provided for each of the vehicle wheels 20, 22, 24, 26. A hydraulic master cylinder apparatus 28 interconnects each of the wheel brakes with the hydraulic master cylinder 30. Fluid lines 32, 34, 36, 38 extend from the master cylinder 30 into fluid connection with hydraulic brake cylinders 40, 42, 44, 46 which are provided to actuate the wheel brakes in a conventional manner. The master cylinder apparatus is provided with a foot operated brake pedal which, when depressed by the driver, results in fluid pressure being exerted from the master cylinder 30 through each of the fluid lines 32, 34, 36, 38 to thereby simultaneously actuate each of the brake cylinders 40, 42, 44, 46. Conventionally, a fluid power assist device 50 is provided between the brake pedal 48 and master cylinder 30 to augment and ease the task of applying the brakes.

As is well known, the hydraulic brake system 10 as thus described sometimes gets air entrained in the hydraulic brake fluid used in the system. This air detracts from proper brake actuation in that it is compressible and therefore makes the brakes seem spongy and not react in the desired manner. Proper maintenance of the vehicle hydraulic brake system requires regular check-ups of the brake system, including inspection of brake fluid, to determine whether there is any substantial amount of air entrapped therein. If air is entrapped in the hydraulic fluid to an undesirable level, the situation is rectified by bleeding hydraulic fluid from each of the brake cylinders 40, 42, 44, 46 to physically remove the undesirable brake fluid from the system.

Figure 3:
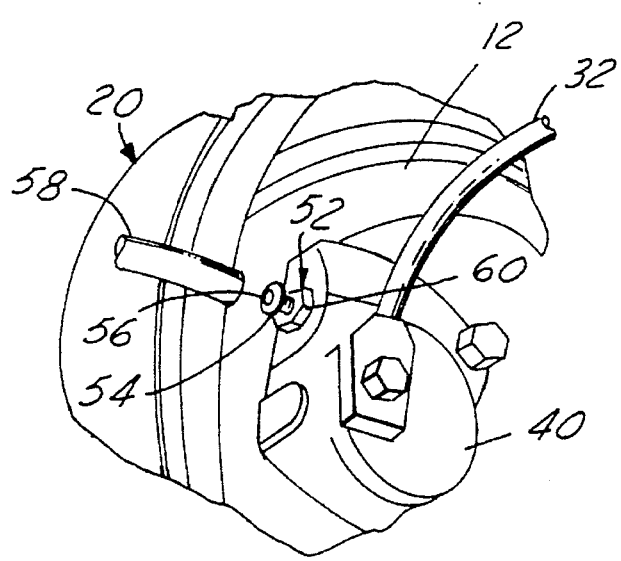
FIG. 3 is a view in perspective of a partial section of a wheel and brake assembly illustrating a conventional brake bleeder valve.

The bleeding activity is accomplished by means of a brake bleeder valve 52 illustrated in FIG. 3. The brake bleeder valve 52 is in fluid communication with a brake cylinder, illustratively the cylinder 40. The valve 52 extends outwardly from the brake cylinder and terminates in a rounded head 54 having an opening 56. One end of the transparent tube 58 is first inserted over the head 54. The bleeder valve 52 is provided with a wrench engagable portion 60. Turning of the portion 60 by means of a wrench in one direction causes the internal valve structure (not shown) to open while turning the portion 60 in the opposite direction causes the valve structure to close. When the valve structure is open, hydraulic brake fluid can exit via the opening 56 into the tube 58.

Figure 1:
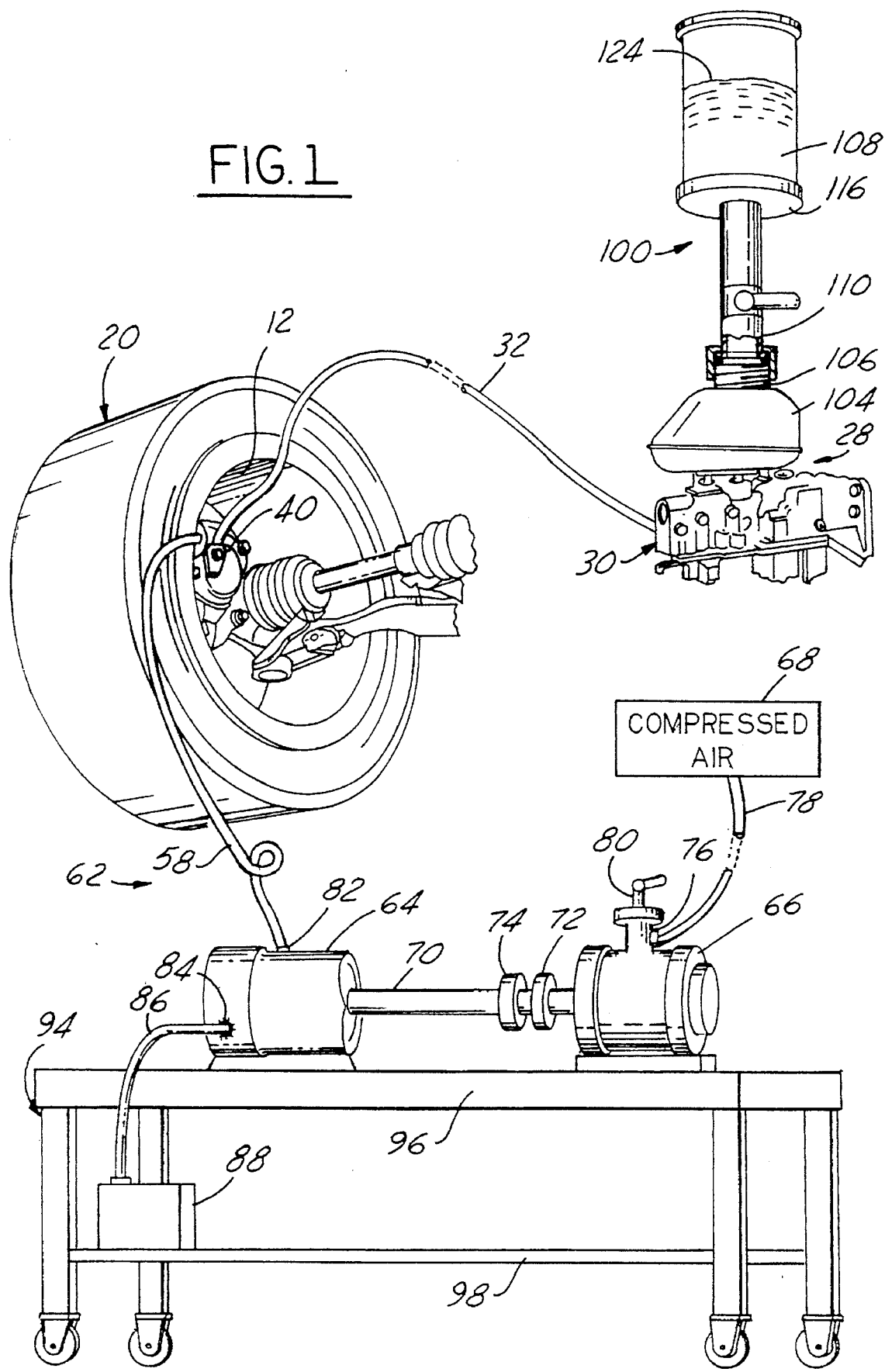
FIG. 1 is a diagrammatic view of one embodiment of the hydraulic brake bleeder apparatus of the present invention.

The hydraulic brake bleeder apparatus 62 is best illustrated in FIG. 1. As will be noted, the brake bleeder apparatus 62 includes a conventional vacuum pump 64 and a conventional pneumatic motor 66. The apparatus 62 takes advantage of the situation in vehicle assembly plants of the ready availability of compressed air, illustrated as a supply source 68 in FIG. 1. Access to a source of compressed air is provided at convenient locations throughout the assembly plant.

The vacuum pump 64 is provided with an input shaft 70 while the pneumatic motor 66 is provided with an output shaft 72. The input shaft 70 is connected to the output shaft 72 by coupling means 74. The pneumatic motor 66 has a compressed air inlet 76. One end of a flexible tube 78 is connected to the source of compressed air 68 while the other end thereof is connected to the compressed air inlet 76 of the pneumatic motor 66 for powering the motor. The pneumatic motor has a manually actuatable valve 80 for controlling the input of compressed air to the motor.

The vacuum pump 64 has a vacuum inlet 82 and a pressure outlet 84. As is conventional, the pump 64 creates a partial vacuum at the inlet 82 and an elevated pressure at the outlet 84. The flexible transparent tube 58 is connected between the vacuum inlet 82 and the brake bleeder valve 52 as previously mentioned. A second flexible transparent tube 86 extends from the pressure outlet 84 to a hydraulic brake fluid recovery reservoir 88 for emptying hydraulic brake fluid therein that is drawn from the brake cylinder via the first tube 58.

Figure 4:
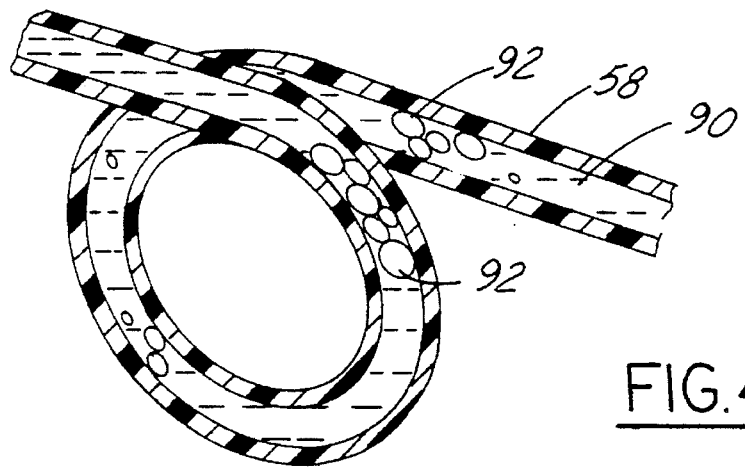
FIG. 4 is a sectional view of a clear plastic hose which is attached to the brake bleeder valve during the bleeding operation showing trapped air in the form of bubbles in the hydraulic brake fluid.

Referring to FIG. 4, it will be noted that a portion of the tube 58 is illustrated in section during operation of a bleeding operation. As will be noted, hydraulic fluid 90 is drawn through the tube 58 from the brake cylinder 40. It is visually observable to the person bleeding the brake that air bubbles 92 are entrained in the fluid 90. The bleeding operation is continued until no more air bubbles are visible. After a good volume of hydraulic fluid has been forced from the brake system, an "air-free flow" in the clear plastic tubes 58, 86 and in the reservoir 88 will indicate a good bleed. When bleeding the brake system, some air may be trapped in the brake line or valving upstream, sometimes as much as ten feet from the bleeder valve 52. For this reason, an adequate amount of hydraulic fluid must be emptied to be sure of proper bleeding.

As will be noted in FIG. 1, a mobile-wheeled cart 94 is provided for mounting the apparatus 62. The cart 94 has an upper shelf 96 and a lower shelf 98. The vacuum pump 64 and pneumatic motor 66 are positioned on the upper shelf 96 while the recovery reservoir 88 is positioned on the lower shelf. This arrangement may my reversed if desired with the pump 64 and motor 66 positioned on the lower shelf 98 and the recovery reservoir 88 positioned on the upper shelf 90. The mobile nature of the cart 94 permits movement of the brake bleeding apparatus 62 around a vehicle assembly plant as necessary.

During the brake bleeding exercise, hydraulic fluid will be drained from the brake system and must be replaced by fresh hydraulic fluid. Hydraulic brake fluid supply means 100 are provided for this purpose. The supply means 100 are attached to the hydraulic master cylinder apparatus 28.

The hydraulic master cylinder 30 has a hydraulic fluid reservoir 104 secured thereto in fluid communication therewith for replenishing hydraulic brake fluid normally lost from the system as by evaporation and leakage. The reservoir 104 has a threaded inlet opening means 106 which is provided for filling the reservoir as necessary after a period of operation of the vehicle. Normally, a closure cap is threadingly received on the inlet opening. However, during the brake bleeding operation, the cap is removed to permit attachment of the supply means 100 thereto.

The brake fluid supply means 100 comprises a container 108 having opening means 110 for filling and emptying. The opening means 110 is securable to the inlet opening means 106 of the master cylinder hydraulic fluid reservoir 104 as illustrated in FIG. 1. The inlet opening means 106 of the master cylinder hydraulic fluid reservoir 104 comprises an externally threaded tubular projection extending from the reservoir and terminating in an open end. The container for hydraulic brake fluid 108 has a bottom 116. The opening means 110 comprises an open-ended tubular projection which extends from the bottom 116. An internally threaded collar 122 is rotatably received on the lower end of the projection. A circumferential flange 125 limits movement of the collar 122. The lower end portion of the container opening means tubular projection 110 is receivable on the opening means tubular projection 106 extending from the reservoir 104 with the collar 122 threadingly received on the threaded portion thereof to thereby secure the container 108 on the master cylinder reservoir 104 in fluid communication therewith for gravity flow of hydraulic brake fluid 124 thereinto.

A fluid valve 126 is provided in the container tubular projection 118. The valve 126 is provided with an actuator arm 128 to permit manual opening and closing of the valve to control fluid flow into the master cylinder reservoir 104.

What is claimed is:

1. Hydraulic brake bleeder apparatus for bleeding hydraulic brake fluid from a vehicle hydraulic brake system that includes a hydraulic motor cylinder apparatus hydraulically connected to the hydraulic cylinders of a plurality of hydraulic vehicle brakes and wherein the master cylinder apparatus includes a hydraulic master cylinder having a hydraulic fluid reservoir with inlet opening means thereinto, comprising;

a vacuum pump having an input drive shaft, a pneumatic motor having an output shaft, coupling means connecting the pneumatic motor output shaft to the vacuum pump input drive shaft, a source of compressed air, the pneumatic motor having a compressed air inlet, a flexible tube connecting the source of compressed air to the air inlet for powering the pneumatic motor, the pneumatic motor having a manually actuatable valve for controlling the input of compressed air to the motor, the vacuum pump having a vacuum inlet and a pressure outlet, a first flexible tube attached to the vacuum inlet and a second flexible tube attached to the pressure outlet, the first flexible tube being connected to a brake cylinder bleeder valve for drawing hydraulic brake fluid from the brake cylinder, a hydraulic brake fluid recovery reservoir, the second flexible tube extending to the hydraulic brake fluid recovery reservoir for emptying hydraulic brake fluid therein that is drawn from the brake cylinder, and hydraulic brake fluid supply means attachable to the master cylinder means of a vehicle hydraulic brake system to replenish the hydraulic brake fluid which is drawn from the brake cylinder.

2. Hydraulic brake bleeder apparatus as defined in claim 1 wherein the hydraulic brake fluid supply means comprises a container for hydraulic brake fluid, the container having opening means for filling and emptying the container, the opening means of the container being securable to the opening means of the master cylinder hydraulic fluid reservoir in fluid communication therewith.

3. Hydraulic brake bleeder apparatus as defined in claim 2 wherein the inlet opening means of the master cylinder hydraulic fluid reservoir comprises a tubular projection extending from the reservoir and terminating in an externally threaded open end portion provided to normally threadingly receive a threaded closure cap, the container for hydraulic brake fluid having a bottom from which a tubular projection extends, the last-mentioned tubular projection terminating in an open end portion, an internally threaded collar rotatably received thereon, the end portion of the container tubular projection being receivable in the tubular projection extending from the master cylinder reservoir with the collar threadingly received on the threaded end portion thereof to thereby secure the container on the master cylinder reservoir in fluid communication therewith for gravity flow of hydraulic brake fluid thereinto.

4. Hydraulic brake bleeder apparatus as defined in claim 3 wherein a fluid valve is provided in the container tubular projection, the valve having an open position and a closed position, and manually actuatable means to facilitate opening and closing of the valve to control fluid flow into the master cylinder reservoir.

5. Hydraulic brake bleeder apparatus as defined in claim 1 wherein a mobile cart is provided having an upper shelf and a lower shelf, the vacuum pump and pneumatic motor being received on the upper shelf and the hydraulic brake fluid recovery reservoir being received on the lower shelf to facilitate gravity flow of hydraulic brake fluid from the vacuum pump to the brake fluid recovery reservoir.

\* \* \* \* \*